United States Patent

[11] 3,596,004

[72] Inventor Rudolf Prochnow
Darmstadt-Eberstadt, Germany
[21] Appl. No 786,643
[22] Filed Dec. 24, 1968
[45] Patented July 27, 1971
[73] Assignee Fernsch GmbH
Darmstadt, Germany
[32] Priority Dec. 27, 1967
[33] Germany
[31] P 15 24 840.5

[54] VIDEO TAPE RECORDER WITH SOUND HEAD HAVING SEPARATE RECORD AND PLAYBACK ELEMENTS SHIFTABLE TO MAINTAIN A FIXED DISTANCE FROM THE VIDEO HEAD WHEEL
4 Claims, 1 Drawing Fig.

[52] U.S. Cl. .......... 179/100.2 T, 178/6.6 A, 179/100.2 CA
[51] Int. Cl. .......... G11b 21/02
[50] Field of Search .......... 179/100.2 T, 100.4 C, 100.41 Y, 100.2 CA; 178/6.6 A, 6.6 FSS, 6.6 DO

[56] References Cited
UNITED STATES PATENTS
2,087,135 7/1937 Wielage .......... 179/100.41
2,793,253 5/1957 Howey .......... 179/100.2
3,064,333 11/1962 Kristiansen et al. .......... 179/100.2
3,159,501 12/1964 Maxey .......... 178/6.6

*Primary Examiner*—Bernard Konick
*Assistant Examiner*—Robert S. Tupper
*Attorney*—Michael S. Striker ABSTRACT: An apparatus for deriving at least two different information signals from a tapelike information carrier, especially the video signal and the sound signal of a television program from the magnetic tape of a video tape recorder by a rotating head wheel for the video signal and a combined sound head with one magnetic circuit for recording and another magnetic circuit for reproducing the sound signal in a longintudinal sound track, the gaps of the two magnetic circuits having a fixed distance in the direction of the sound track. The combined sound head is displaceable in the direction of the sound track, by such an amount that the gap of the reproducing magnetic circuit in the reproducing mode has the same distance from the head wheel as the gap of the recording magnetic circuit in the recording mode. The shifting of the combined sound head can be effected automatically, e.g. by an electromagnet, during change between recording and reproducing mode of the video tape recorder.

PATENTED JUL 27 1971
3,596,004
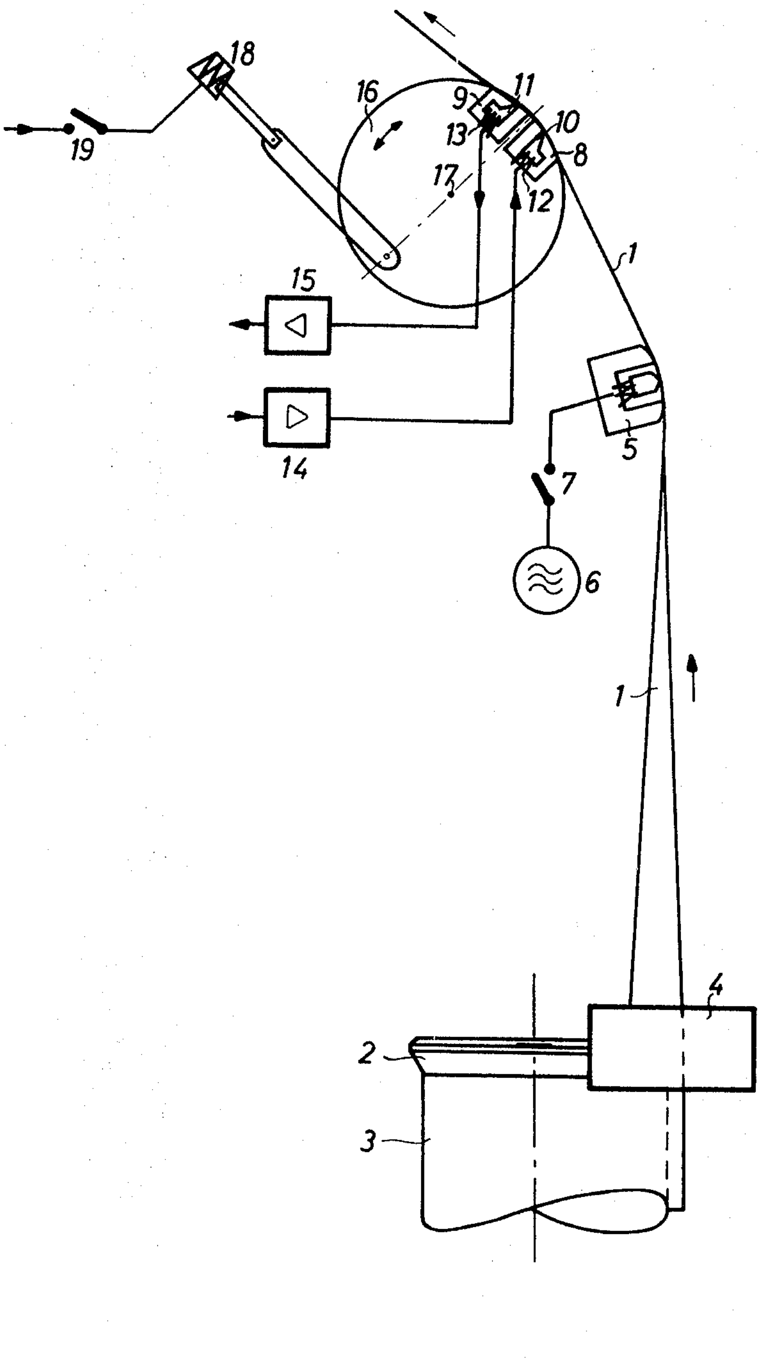
Inventor:
Rudolf Prochnow
Michael S. Striker
Attorney

VIDEO TAPE RECORDER WITH SOUND HEAD HAVING SEPARATE RECORD AND PLAYBACK ELEMENTS SHIFTABLE TO MAINTAIN A FIXED DISTANCE FROM THE VIDEO HEAD WHEEL

BACKGROUND OF THE INVENTION

The invention relates to an apparatus for deriving at least two different information signals from a tapelike information carrier using for each of the information signals a reproducing device. These information signals can be a video signal which is recorded on a magnetic tape and a sound signal associated with said video signal.

In a known magnetic video tape recorder the video signal is recorded in transversal tracks of a broad magnetic tape by means of a rotating head-wheel on the circumference of which several, generally four, magnetic heads are arranged at equal angular distances, while the respective sound signal is recorded in a longitudinal track parallel to the edge of the magnetic tape by means of a stationary magnetic head. The reproduction of the video signal results from the same magnetic heads on the rotating head-wheel by which the video signal had been recorded. Generally the same head is used for the reproduction as well as for the recording of the sound signal.

In constructing such a combined recording and reproducing head for the sound signal with one gap and one winding, a compromise must be reached between the conflicting requirements for the recording and the reproducing system. For recording the magnetic head should have a relatively wide working gap and an additional gap on the backside of the head, while for reproducing a small gap is suitable with a usually closed magnetic circuit and no additional gap on the backside of the head. Further the winding of the recording respectively the reproducing head should be adapted to the recording or reproducing amplifier. This requires a different performance of the windings. When recording and reproducing a sound signal associated to a video signal in a magnetic video tape recorder the use of a combined recording and reproducing head is very disadvantageous as the sound track is very small, for instance only approximately 1,8 mm.

For the examination of the sound signal recorded by a combined recording and reproducing head usually an additional reproducing head is arranged following the combined head which in a known construction is kept at a distance of approximately 52 mm. from the combined recording and reproducing head.

To improve the quality of the sound recording in a magnetic video tape recorder it has already been suggested to use a combined recording and reproducing head which has two magnetic circuits arranged close to each other, the first of which is used for the recording and the second for the reproduction, both magnetic circuits are optimally dimensioned for their special purpose. For mechanical reasons the distance of the two gaps of such a combined recording and reproducing head cannot be smaller than approximately 6 mm. In the recording mode the magnetic circuit for the reproduction serves for checking the sound recording. In view of the small distance between the two magnetic circuits, it is necessary, in order to arrive a crosstalk between the recording and the reproducing circuit, to provide a suitable magnetic shielding between the two magnetic circuits and a compensation for signals which are induced directly into the reproducing circuit.

In such a combined magnetic head with two separate magnetic circuits difficulties arise, if the recording on the magnetic video tape should be re-recorded upon another magnetic tape once or several times. In consequence of the distance between the recording and the reproducing gap which, according to the aforesaid, cannot be diminished beyond approximately 6 mm., the reproducing of the sound signal occurs at another place, in relation to the recorded video signal of the tape, as the recording, and therefore the reproduced sound signal is displaced in time against the recorded signal. So that such a displacement in time between picture and the associated sound cannot yet be noticed, it shall not exceed 20 msec according to one field or a tape length of approximately 8 mm. at a standard tape speed of approximately 40 cm./sec. Already in the reproducing of the original recording the allowable displacement is reached with the above-mentioned combined recording and reproducing head with separate magnetic circuits. If the original tape is re-recorded upon another magnetic tape this displacement is increased and therefore exceeds the allowable length at the single re-recording The error is enlarged if several re-recordings take place.

It is an object of the present invention to avoid the aforesaid error in video tape recorders provided with a combined recording-reproducing sound head with two magnetic circuits and two gaps displaced in the direction of the longitudinal sound track on the magnetic tape. In the present invention, the combined recording-reproducing sound head is displaceable in the direction of the sound track, contrary to the usual manner in which the sound head is placed in a fixed position, and the distance between the sound head and the head wheel for recording and reproducing the video signal is always the same.

A further object of the invention is an apparatus for shifting the combined sound head, in which the sound head is arranged on the circumference of a drum rotatable between stops.

According to another object of the invention the displacement of the combined sound head is effected automatically, when the operation of the video tape recorder is changed from the recording mode to the reproducing mode and vice versa.

According to another object of the invention the reproducing magnetic circuit of the combined sound head is used for checking the sound signal recorded by the recording magnetic circuit of the combined sound head on the magnetic tape.

For changing the position of the combined recording and reproducing head for the sound signal said head can be arranged movable in the direction of the tape. In the recording mode the head is placed so that the sound recording occurs at the standardized distance from the picture recording. During reproducing of the recorded signals the combined head is displaced for such a distance opposite to the direction of the motion of the tape that the reproducing gap is arranged at the same place where the gap of the magnetic circuit for the recording has been located in the recording mode. Thus, a picture/sound displacement does not occur anymore so that during reproducing the sound signal, said signal occurs from the original tape and also after a deliberately repeated re-recording without any displacement in time between picture and sound.

The displacement of the magnetic head between the two positions for recording and reproducing may be carried out by hand, but suitable this change is effected automatically by electromagnetic means which are operated at the same time as the switchover from the recording to the reproducing mode. During the recording mode the magnetic circuit for the reproduction serves in known manner for the checking of the recorded sound signal. The resulting displacement in time of the sound with a combined head having the smallest practically possible distance practically possible between the two magnetic gaps of 6—8 mm. and a tape speed of approximately 40 cm./sec. is below the limit of the perception, i.e. below 20 msec, and is not noticeable.

SUMMARY OF THE INVENTION

An apparatus for deriving at least two different information signals from a tapelike information carrier using for each of the information signals a reproducing device wherein the distance between said reproducing devices for the different information signals is changeable. One of the reproducing device is movable in the direction of the track recorded on the tapelike information carrier.

Especially an apparatus for recording and reproducing a video signal and an associated sound signal on and from a longitudinal track of a magnetic tape using a combined recording and reproducing magnetic head with one magnetic circuit with a gap for recording and another magnetic circuit with a gap for reproducing, the gaps being spaced a small distance in the direction of the sound track of the magnetic tape from each other, wherein the combined sound head is movable in the direction of the soundtrack between stops for an amount corresponding to the distance between the gaps. In this manner the gap of the magnetic circuit for reproducing the sound signal can be brought in the same position in relation to the associated video signal recorded on the tape as the gap of the other magnetic circuit, which had recorded the sound signal associated with the video signal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The FIG. shows a video tape recorder in simplified and schematical representation. Only the parts of the video tape recorder necessary for the understanding of the invention are schematically presented.

DESCRIPTION OF THE PREFERRED EMBODIMENTS

The recording of the video signal is effected in transversal tracks of a magnetic tape 1, which is transported in direction of the arrow by a mechanism not shown, by means of the magnetic heads arranged on the circumference of the rotating head wheel 2. The head wheel 2 is rotated by an electromotor 3. The tape 1 is directed around a part of the circumference of the head wheel 2 by a tape guide 4. By an erase head 5 the remaining parts of the video recording the edge track of the magnetic tape which shall receive the sound recording is erased. The erase head is fed by the erase current generator 6 and is switched in the mode "recording" by means of the switch 7.

The combined recording and reproducing head comprises a magnetic circuit for the recording and a magnetic circuit for reproducing of the sound signal. The working gaps 10 and 11 are arranged at a distance of approximately 6 mm. from each other. The windings 12, respective 13, of the two magnetic circuits 8, respective 9, are connected with the recording amplifier 14 and the reproducing amplifier 15.

In the mode "recording" the winding 12 is fed with the sound signal from the recording amplifier 14. In this mode the combined head has such a position that the distance between the gap 10 of the combined head and of the tracks of the video heads upon the head wheel 2 as measured on the magnetic tape 1 amounts to the standardized length, 236 mm. e.g. according to the German Standard (DIN 15900).

In the reproduction mode the combined head must be displaced according to the invention into a new position so that the gap 11 of the magnetic circuit for the reproduction is shifted into the former position of the gap 10 so that the distance of the gap 11 in relation to the tracks of the video magnetic heads is the same as during the recording mode, i.e. for instance 236 mm.

Therefore the combined head is movable arranged so that it can be moved along the magnetic tape. This can be effected in the manner shown in the drawing by arranging the combined head on a drum 16, which is turnable around an axis 17. By turning the drum 17 between stops the combined head can be moved on the circumference of the drum over the distance between the gaps 10 and 11. The movement can be profitably effected automatically as by means of the electromagnet 18. The electromagnet 18 is energized by means of a switch 19. The switch 19 is suitable closed when the changeover switch is actuated into the reproduction mode.

I claim:

1. Apparatus for recording and reproducing video signals on transversal tracks of a tape movable in longitudinal direction and for recording and reproducing sound signals on a longitudinal track of such tape, said apparatus comprising a rotating head wheel for recording and reproducing said transversal tracks; a combined recording and reproducing head spaced in the direction of movement of the tape from the head wheel and having a first gap and a first magnetic circuit for recording and a second gap and a second magnetic circuit for reproducing said longitudinal track, said gaps being spaced in the direction of movement of said tape a predetermined distance from each other; and means cooperating with said combined recording and reproducing head for displacing the latter in the direction of movement of said tape by said predetermined distance between said gaps when said head is used either for recording or reproducing sound signals to maintain the distance of the respective gap from said head wheel.

2. An apparatus as defined in claim 1, wherein said displacement means comprise electromagnetic means energizable whenever the combined recording and reproducing head is switched over from recording to reproducing and vice versa.

3. An apparatus as defined in claim 1, wherein said combined recording and reproducing head is mounted adjacent the periphery of a drum turnable about an axis extending transverse to the movement of the tape, said first and said second gap being spaced in the circumferential direction of said periphery from each other, said displacement means being connected to the drum for turning the latter in one and in the opposite direction through a given angle about its axis.

4. An apparatus as defined in claim 3, wherein said displacement means comprise electromagnet means and means connecting said electromagnetic means to the drum to turn the latter in one or the opposite direction through said given angle.